(No Model.)

F. J. BOYLE.
AUTOMATIC FISHING REEL.

No. 599,138. Patented Feb. 15, 1898.

WITNESSES

INVENTOR

UNITED STATES PATENT OFFICE.

FAYETTE J. BOYLE, OF TACOMA, WASHINGTON.

AUTOMATIC FISHING-REEL.

SPECIFICATION forming part of Letters Patent No. 599,138, dated February 15, 1898.

Application filed May 4, 1897. Serial No. 635,014. (No model.)

*To all whom it may concern:*

Be it known that I, FAYETTE J. BOYLE, a citizen of the United States, residing at Tacoma, in the county of Pierce and State of Washington, have invented certain new and useful Improvements in Automatic Fishing-Reels; and I do hereby declare the following to be a full, clear, and exact description of the invention, such as will enable others skilled in the art to which it appertains to make and use the same.

My invention relates to improvements in automatic fishing-reels; and it consists in a reel having a suitable casing and winding spool or drum mounted therein, mechanism for revolving the said spool and a spring for actuating the same, and means for controlling the movement of the drum at the will of the person using the same.

It also consists in certain other novel constructions, combinations, and arrangements of parts, as will be hereinafter fully described and claimed.

Figure 1:
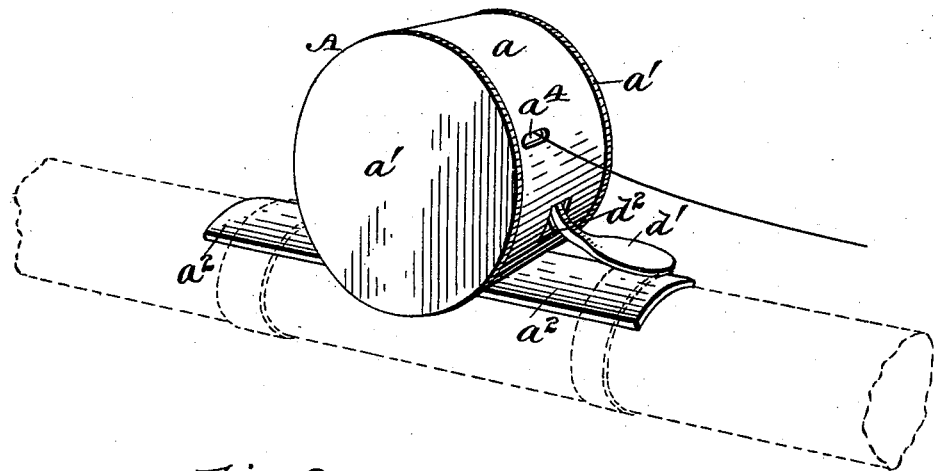
Figure 2:
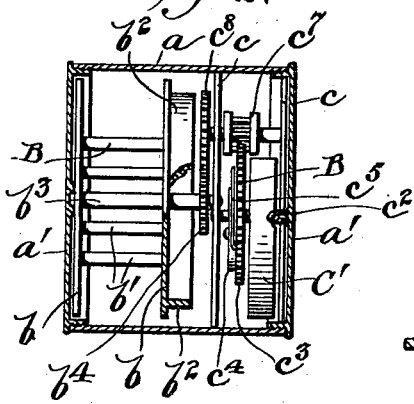
Figure 3:
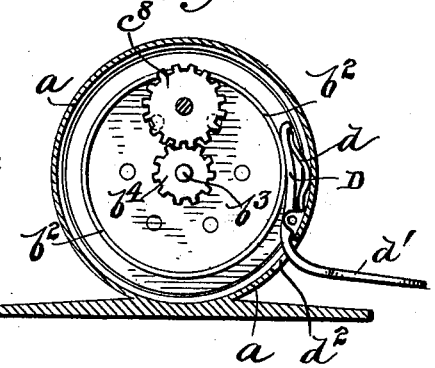
Figure 4:
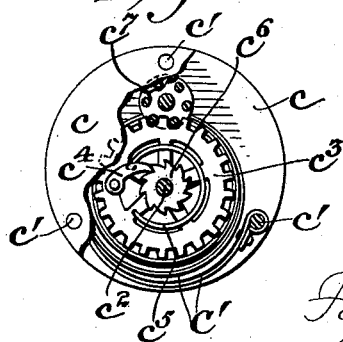

In the drawings, Figure 1 represents a perspective view of my improved reel. Fig. 2 represents a central transverse section of the same. Fig. 3 represents a cross-section through the reel on a line at right angles to the section shown in Fig. 2, and Fig. 4 represents a detail view of the reel-actuating mechanism.

A in the drawings represents the casing. B represents the spool, and C the operating mechanism of my improved reel.

The casing A is preferably formed of an inclosing ring $a$, having end cap-pieces $a'$ $a'$, adapted to be secured to the ends of the ring in any suitable manner. As shown in the drawings, the caps $a'$ $a'$ are provided with inwardly-extending flanges having screw-threads upon their exterior surfaces for engaging corresponding threads upon the inner surface of the ring $a$. Inside of the casing A is mounted the actuating mechanism C, which preferably consists of two plates or disks $c$ $c$, secured together by posts $c'$ $c'$. Mounted between these plates $c$ $c$ is the main shaft of the mechanism $c^2$, having its ends journaled in each plate, and a coil-spring C′, similar to a clock-spring, is secured to the said shaft at one end, its outer end being secured to one of the fixed posts $c'$. To one side of the shaft $c^2$ is secured the main gear-wheel of the mechanism $c^3$. On one face of the wheel $c^3$ is mounted a dog $c^4$, adapted to engage a ratchet $c^6$, secured to said shaft $c^2$ to one side of the wheel $c^3$. A spring $c^5$, also secured to the gear-wheel $c^3$, presses against the dog $c^4$ and holds it against the ratchet-wheel $c^6$. The outer end of the shaft $c^2$ extends just outside the plate $c$, and is provided with an aperture adapted to receive a key of any suitable shape for winding up the spring upon removing the cap $a'$. The gear-wheel $c^3$ engages a pinion $c^7$, secured to a shaft also mounted in the plates $c$ $c$, the inner end of said shaft projecting through the inner plate $c^2$ and carrying upon the said inner end another gear-wheel $c^8$. The spool B is also mounted in the casing A between one end thereof and the actuating mechanism C. It consists of parallel plates or disks $b$ $b$, secured together by a number of cross-bars $b'$ $b'$. Upon the inner face of the inner plate $b$ an annular flange $b^2$ is formed. The spool is mounted upon a shaft $b^3$, having one end journaled in the end plate $a'$ and its inner end journaled in the inner plate $c$ of the actuating mechanism C. The shaft near its inner end also carries a pinion $b^4$, adapted to mesh on the gear-wheel $c^8$. It will thus be seen that the spool B is adapted to be revolved by the gearing above described when the same is actuated by the spring C′.

In order to prevent the spool from revolving except when it is desired for the purpose of reeling in a line, a brake is secured within the casing A, consisting of a broad bar D, pivotally mounted in the casing A and adapted to bear with one end upon the annular flange $b^2$. A spring $d$ bears against the said bar or brake D and forces the said brake against the flange $b^2$. The brake D is also provided with a lever $d$, extending through an aperture $d^2$ in the casing, having its outer end flattened, whereby it may be engaged by the finger or thumb of the person using the reel. When it is desired to allow the spool to be wound up and draw in the fishing-lines, it is merely necessary to press slightly upon the brake-lever $d'$, thereby relieving the flange $b^2$ of the pressure of the brake D, when the spool will be free to rotate as desired. It will thus be seen that the movement of the spool may be readily controlled at the will of the person using it. The amount of pressure upon the brake-lever $d'$ regulates the speed with which the spool is permitted to revolve. The connecting-bars of the spool B form a winding means for receiving the fishing-line as it is wound in. One end of the line may be secured to one of the bars $b'$ and will be wound about all of said bars as the spool revolves. The line passes out a suitable aperture $a^4$ in the casing A. The casing A is preferably provided with an attaching-bar $a^2$, of usual form, by which it may be secured to a fishing-rod in the usual manner.

It will be apparent that by my improved construction of reel I am enabled to produce one which is particularly well adapted for the purpose of winding in fishing-lines, especially as it requires very little attention from the person using it, so that the greatest attention may be bestowed upon the game which it is desired to secure, it only being necessary to wind up the spring before beginning the operation of fishing. This leaves only the necessity of regulating the pressure of the hand upon the brake-lever in order to control the winding up of the fishing-line more or less and at the proper time.

Having now described my invention, what I claim as new, and desire to secure by Letters Patent, is—

1. In a fishing-reel, the combination of an inclosing casing, a winding-spool mounted in one side of the said casing, and a spring-actuated operating mechanism mounted in the other side of the said spool for rotating the same, an annular flange projecting laterally from one side of the spool so as to present a braking-surface, a brake comprising a lever pivoted to the inner surface of the casing, the inner end of said lever being adapted to bear upon the said annular flange, a spring for forcing the said end against the said flange, and an operating-handle formed upon the said lever exteriorly of the said casing for regulating the pressure of the brake upon the flange, substantially as described.

2. In a fishing-reel, the combination of an inclosing casing, for excluding water from the working parts comprising a ring portion and removable heads, a winding-spool mounted in said casing being journaled at one end in one of the said inclosing heads, the other end being mounted in a partition in the said casing, a spring-operating mechanism mounted in said casing between the said partition and the opposite head of the casing, means for connecting said operating means with the said spool, and a broad annular flange formed upon one side of the said spool, a braking-lever pivoted to the ring of the casing interiorly thereof and adapted to bear with one of its ends upon the said laterally-projecting flange, a spring for holding the said end against the flange, the other end of the said lever projecting exteriorly of the casing and a handle provided thereon for regulating the pressure of the lever upon the braking-flange, substantially as described.

In testimony whereof I affix my signature in presence of two witnesses.

FAYETTE J. BOYLE.

Witnesses:
 FRANK J. MILLER,
 C. M. EASTERDAY.